(12) United States Patent
Johnson (10) Patent No.: US 10,793,257 B2
(45) Date of Patent: Oct. 6, 2020

(54) FLIGHT CONTROL SYSTEMS AND METHODS FOR AN AERIAL VEHICLE

(71) Applicant: The Boeing Company, Chicago, IL (US)

(72) Inventor: Mitchell Johnson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 15/888,957

(22) Filed: Feb. 5, 2018

(65) Prior Publication Data

US 2019/0241253 A1 Aug. 8, 2019

(51) Int. Cl.
  *B64C 13/12* (2006.01)
  *B64C 13/28* (2006.01)
  *B64C 13/04* (2006.01)

(52) U.S. Cl.
  CPC ............ *B64C 13/12* (2013.01); *B64C 13/044* (2018.01); *B64C 13/0423* (2018.01); *B64C 13/341* (2018.01)

(58) Field of Classification Search
  CPC . B64C 13/12; B64C 13/30–34; B64C 13/341; B64C 13/343; B64C 13/28;
  (Continued)

(56) References Cited

U.S. PATENT DOCUMENTS 2,478,173 A * 8/1949 Austin .................... B64C 13/12
                                                    74/480 R
3,902,379 A * 9/1975 Bennett .................. B64C 13/12
                                                    74/480 R
(Continued)

FOREIGN PATENT DOCUMENTS

| EP | 0067215 B1 | 11/1986 |
|---|---|---|
| EP | 1 348 622 A2 | 10/2003 |
| WO | WO 82/02178 A1 | 7/1982 |

OTHER PUBLICATIONS

Extended European Search Report prepared by the European Patent Office in Application No. EP 19 15 5328.8 dated Jul. 1, 2019.

*Primary Examiner* — Richard R. Green
*Assistant Examiner* — Arfan Y Sinaki
(74) *Attorney, Agent, or Firm* — McDonnell Boehnen Hulbert & Berghoff LLP (57) ABSTRACT

In an example, a system includes a first controller for controlling a first-flight-control surface, a second controller for controlling a second-flight-control surface, and a first override system including a mechanical linkage between the first controller and the second controller. The first override system is configured such that: (i) while less than a first threshold amount of force is applied to the mechanical linkage, movement of the first controller causes a corresponding movement of the second controller and vice versa, and (ii) while greater than the first threshold amount of force is applied to the mechanical linkage, the first controller and the second controller move separately. The system also includes a second override system operable to permanently disconnect the mechanical linkage responsive to greater than a second threshold amount of force applied to the mechanical linkage. The second threshold amount of force is greater than the first threshold amount of force.

20 Claims, 9 Drawing Sheets

(58) Field of Classification Search
CPC .. G05G 1/01; G05G 1/04; G05G 1/34; G05G 11/00; G05G 13/00; G05G 700/22
See application file for complete search history.

(56) References Cited

U.S. PATENT DOCUMENTS

| | | | |
|---|---|---|---|
| 3,949,958 A * | 4/1976 | Richter | B64C 13/12 244/227 |
| 4,403,756 A * | 9/1983 | Berlin | B64C 13/46 244/227 |
| 5,782,436 A * | 7/1998 | Pohling | B64C 13/12 244/229 |
| 9,437,056 B2 | 9/2016 | Huynh et al. | |
| 2014/0042269 A1* | 2/2014 | Zantz | B64C 13/42 244/99.3 |
| 2017/0274986 A1* | 9/2017 | Huynh | B64C 13/505 |

\* cited by examiner

FLIGHT CONTROL SYSTEMS AND METHODS FOR AN AERIAL VEHICLE

FIELD

The present disclosure generally relates to a flight control system for an aerial vehicle, and more particularly to a flight control system including an override system that can permanently disconnect two controllers when a jam occurs within the flight control system.

BACKGROUND

In general, an aerial vehicle includes a flight control system, which may be used to control the attitude and flight path of the aerial vehicle. In some instances, a jam may occur within the flight control system, which impairs the flight control system.

SUMMARY

In an example, a system is described that includes a first controller configured to control a first flight control surface of an aerial vehicle, a second controller configured to control a second flight control surface of the aerial vehicle, and a first override system comprising a mechanical linkage between the first controller and the second controller. The first override system is configured such that: (i) while less than a first threshold amount of force is applied to the mechanical linkage by the first controller and the second controller, movement of the first controller causes a corresponding movement of the second controller and movement of the second controller causes a corresponding movement of the first controller, and (ii) while greater than the first threshold amount of force is applied to the mechanical linkage by the first controller and the second controller, the first controller and the second controller move separately relative to each other.

The system also includes a second override system operable to permanently disconnect the mechanical linkage between the first controller and the second controller responsive to greater than a second threshold amount of force applied to the mechanical linkage by the first controller and the second controller. The second threshold amount of force is greater than the first threshold amount of force.

In another example, a method of operating an aerial vehicle is described. The aerial vehicle includes a first controller configured to control a first flight control surface, a second controller configured to control a second flight control surface, a first override system including a mechanical linkage between the first controller and the second controller, and a second override system. The method includes applying, by the first controller and the second controller to the mechanical linkage, a first force that is less than a first threshold amount of force to cause the first controller to move together with the second controller. Responsive to applying the first force, the method includes actuating the first flight control surface and the second flight control surface.

Additionally, the method includes applying, by the first controller and the second controller to the mechanical linkage, a second force that is greater than the first threshold amount of force to cause the first controller and the second controller to move separately relative to each other. Responsive to applying the second force, the method includes actuating one of the first flight control surface or the second flight control surface. The method also includes applying, by the first controller and the second controller to the mechanical linkage, a third force that is greater than a second threshold amount of force to disconnect the mechanical linkage between the first controller and the second controller. The second threshold amount of force is greater than the first threshold amount of force.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As noted above, an aerial vehicle typically includes a flight control system, which can be used to control the attitude and flight path of the aerial vehicle. In general, the flight control system includes one or more controllers for controlling one or more flight control surfaces of the aerial vehicle. The flight control surfaces are actuatable to adjust a pitch, a roll, and/or a yaw of the aerial vehicle in flight. As examples, the flight control surfaces can include one or more elevators, rudders, ailerons, flaps, spoilers, leading edge flaps, leading edge slats, and/or trim tabs.

In some instances, the flight control system includes a first controller for a first pilot in a cockpit of the aerial vehicle and a second controller for a second pilot in the cockpit. The flight control system can be arranged such that the first controller is coupled to a first flight control surface, and the second controller is coupled to a second flight control surface. Additionally, the flight control system can include a mechanical linkage between the first controller and the second controller. Under normal operating conditions, the mechanical linkage can cause the first controller and the second controller to move together. As such, the mechanical linkage can provide for either the first pilot or the second pilot, by movement of his or her respective controller, simultaneously moving both the first flight control surface and the second flight control surface under normal operating conditions.

As a safety precaution, the aerial vehicle can include one or more features for addressing the relatively remote possibility that a jam may occur within the flight control system. The term "jam" as used herein refers to a condition in which the movement of one or more components of the flight control system becomes impaired. If either of the first controller or the second controller becomes jammed, both the first controller and the second controller may be impaired due to the mechanical linkage between the first controller and the second controller.

To provide for controllability of the aerial vehicle in a situation in which one controller has jammed, the aerial vehicle can include a resetting override system. The resetting override system can cause the mechanical linkage to temporarily decouple the first controller from the second controller to allow the first controller to move independently of the second controller. Once decoupled, the non-jammed controller can actuate the flight control surface to which it is coupled. Accordingly, although the jam may impair operation of one flight control surface, the aerial vehicle can still be controlled using the remaining flight control surfaces.

To temporarily decouple the first controller and the second controller, the pilot of the non-jammed controller provides an input force to the non-jammed controller, which is sufficient to overcome a breakout force threshold of the resetting override system. However, the pilot of the non-jammed controller must maintain that input force as long as the first controller and the second controller are at different positions (e.g., for the duration of a flight after a jam occurs). This can lead to over exertion and increased pilot work load if the pilot has to maintain the input force for an extended period of time.

Example systems and methods described herein can beneficially address at least some drawbacks of existing flight control systems. Within examples, a flight control system includes a first controller for controlling a first flight control surface, a second controller for controlling a second flight control surface, a first override system, and a second override system. The first override system can be a resetting override system. As such, the first override system includes a mechanical linkage between a first controller and a second controller. While less than a first threshold amount of force is applied to the mechanical linkage by the first controller and the second controller, movement of the first controller causes a corresponding movement of the second controller and movement of the second controller causes a corresponding movement of the first controller. Whereas, while greater than the first threshold amount of force is applied to the mechanical linkage by the first controller and the second controller, the first controller and the second controller move separately relative to each other.

The second override system is operable to permanently disconnect the mechanical linkage between the first controller and the second controller responsive to greater than a second threshold amount of force applied to the mechanical linkage by the first controller and the second controller. Within examples, the second threshold amount of force is greater than the first threshold amount of force. By "permanently disconnect" it is meant that the connection between the first controller and second controller is permanently and physically broken so that movement of the first controller cannot cause a corresponding movement of the second controller after the permanent disconnection, and vice versa.

In this arrangement, when a jam occurs in one of the controllers, a pilot can first provide an input force to the unjammed controller, which causes the first controller and the second controller to apply a force to the mechanical linkage greater than the first threshold amount of force and less than the second threshold amount of force. As long as the pilot maintains this input force, the first override system temporarily decouples the first controller from the second controller, which allows the pilot to control the aerial vehicle using the flight control surface(s) coupled to the non-jammed controller.

If the pilot determines that this input force may need to be maintained for a relatively long period of time and it would be undesirable to do so, the pilot can actuate the second override system to permanently disconnect the mechanical linkage (i.e., to permanently disconnect the jammed controller from the non-jammed controller). Specifically, the pilot can increase the input force so that the first controller and the second controller apply a force to the mechanical linkage greater than the second threshold amount of force. Once the mechanical linkage is permanently disconnected, the jammed controller may remain jammed. However, the non-jammed controller can be operated at significantly lower input forces to control the flight control surface(s) coupled to the non-jammed controller.

The systems and method of the present disclosure can thus allow a pilot to choose if disconnecting the first controller and the second controller would be beneficial, while maintaining the benefits of a resetting override system. Accordingly, the systems and methods of operating the aerial vehicle can enhance the mechanics of the flight control system and/or enhance the operational safety associated with the flight control system.

Figure 1:
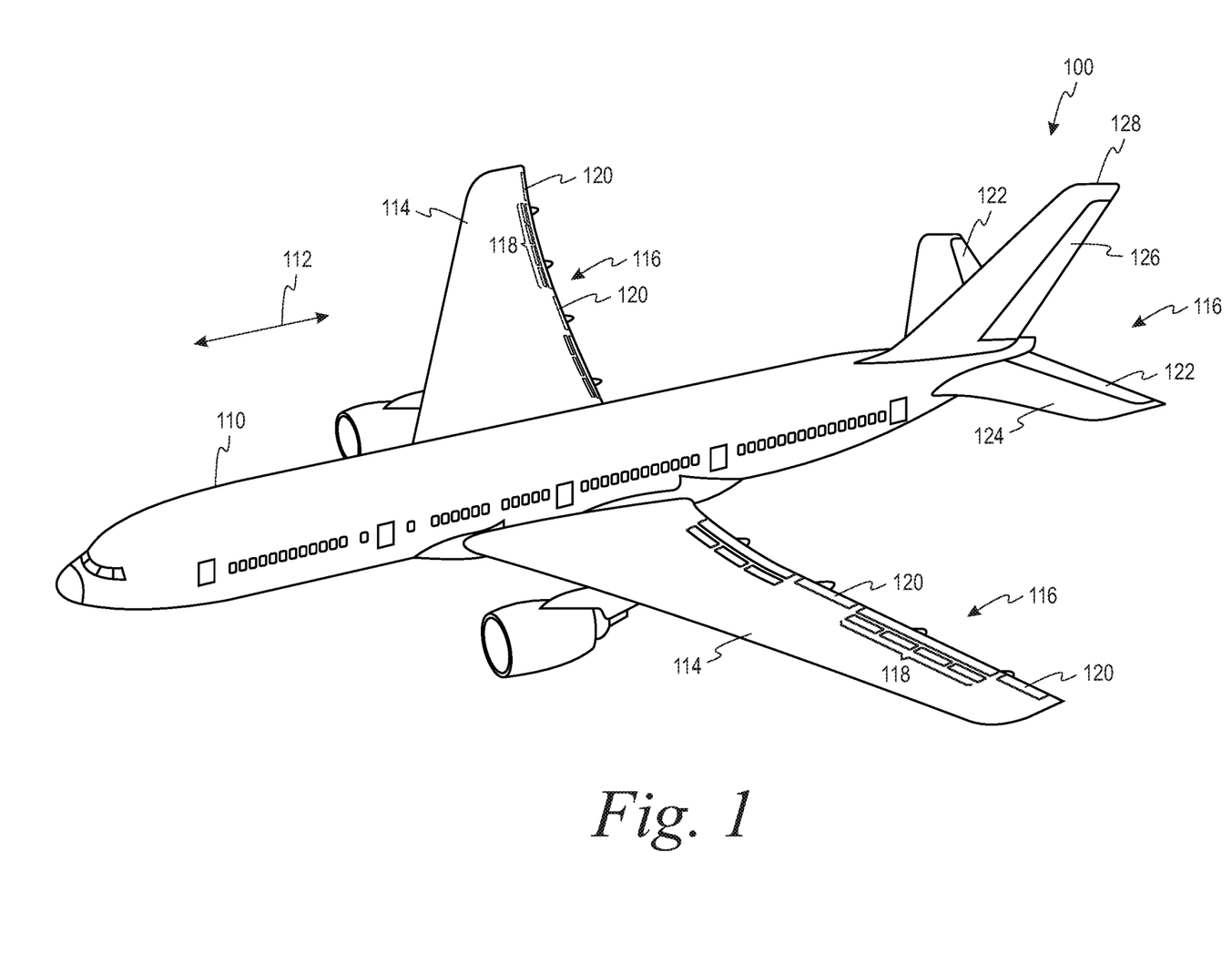
FIG. 1 illustrates a perspective view of an aerial vehicle, according to an example embodiment.

Referring now to FIG. 1, a perspective view of an aerial vehicle 100 is depicted according to an example embodiment. In FIG. 1, the aerial vehicle 100 is a fixed-wing aircraft. As such, in FIG. 1, the aerial vehicle 100 includes a fuselage 110 that extends in a longitudinal direction 112, and a pair of wings 114 extending from the fuselage 110 in a transverse direction relative to the longitudinal direction 112. Although the aerial vehicle 100 is depicted as a fixed-wing aircraft in FIG. 1, the aerial vehicle 100 can be a helicopter, a lighter-than-air vehicle, and/or a spacecraft in other examples. More generally, the aerial vehicle 100 can be any vehicle that can travel by air.

As shown in FIG. 1, the aerial vehicle 100 includes a plurality of flight control surfaces 116, which are actuatable to adjust a pitch, a roll, and/or a yaw of the aerial vehicle 100 in flight. As examples, the flight control surfaces 116 can include one or more elevators, rudders, ailerons, flaps, spoilers, leading edge flaps, leading edge slats, and/or trim tabs. In FIG. 1, for instance, the flight control surfaces 116 include a plurality of spoilers 118 and ailerons 120 on each wing 114, a pair of elevators 122 on a horizontal stabilizer 124 of the aerial vehicle 100, and a rudder 126 on a vertical stabilizer 128 of the aerial vehicle 100.

Figure 2:
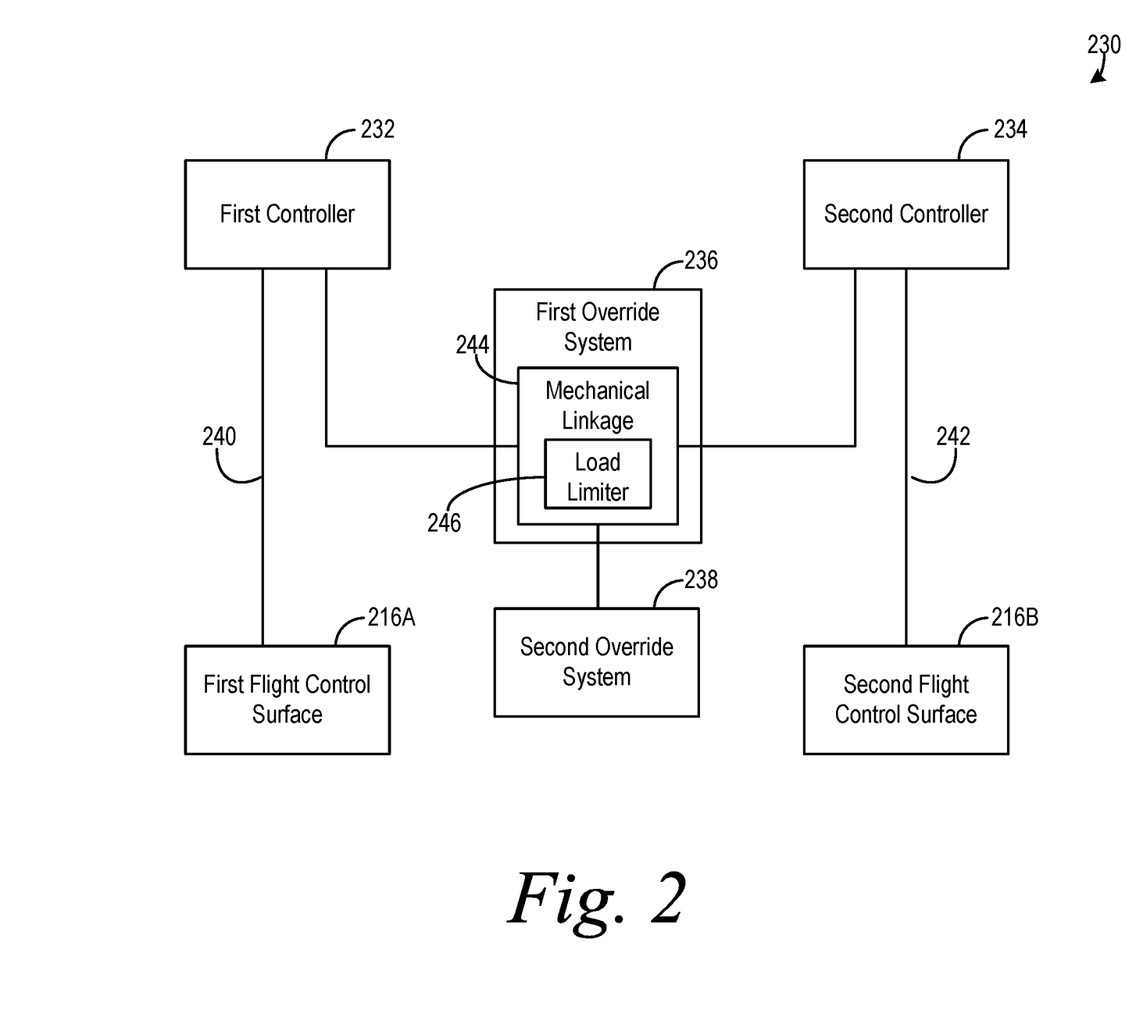
FIG. 2 illustrates a simplified block diagram of a flight control system for an aerial vehicle, according to an example embodiment.

Referring now to FIG. 2, a simplified block diagram of a flight control system 230 is depicted according to an example embodiment. As shown in FIG. 2, the flight control system 230 includes a plurality of flight control surfaces 216A-216B, a first controller 232, a second controller 234, a first override system, 236, and a second override system 238. In FIG. 2, the flight control surfaces 216A-216B include a first flight control surface 216A and a second flight control surface 216B. As described above, the flight control surfaces 216A-216B can include, for example, one or more elevators, rudders, ailerons, flaps, spoilers, leading edge flaps, leading edge slats, and/or trim tabs.

As also shown in FIG. 2, the first flight control surface 216A is coupled to the first controller 232 by a first control path 240, and the second flight control surface 216B is coupled to the second controller 234 by a second control path 242. The first control path 240 and the second control path 242 can provide respective mechanical and/or fly-by-wire connections between the first controller 232 and the first flight control surface 216A, and the second controller 234 and the second flight control surfaces 216B. Stated differently, the flight control system 230 can provide a reversible and/or an irreversible connection between the first controller 232 and the first flight control surface 216A, and the second controller 234 and the second flight control surface 216B. Accordingly, in this arrangement, the first controller 232 can control the first flight control surface 216A and the second controller 234 can control the second flight control surface 216B.

Within examples, the first controller 232 can include a first control column, a first control stick, a first wheel, and/or a first rudder pedal, which is operable by a first pilot in a cockpit of the aerial vehicle 100 for controlling the first flight control surface 216A. Similarly, the second controller 234 can include a second control column, a second control stick, a second wheel, and/or a second rudder pedal, which is operable by a second pilot in the cockpit for controlling the second flight control surface 216B.

As shown in FIG. 2, the first override system 236 includes a mechanical linkage 244 between the first controller 232 and the second controller 234. The first override system 236 is a resetting override system. For instance, the mechanical linkage 244 can include a load limiter 246 such as, for instance, a pogo or a bungee. More generally, the load limiter 246 can provide a mechanism for (i) coupling the first controller 232 and the second controller 234 when a force less than a first threshold amount of force is applied to the mechanical linkage 244 by the first controller 232 and the second controller 234, and (ii) temporarily decoupling the first controller 232 and the second controller 232 when a force greater than the first threshold amount of force is applied to the mechanical linkage 244 by the first controller 232 and the second controller 234. By "temporarily decoupled" it is meant that the mechanical linkage 244 restores the coupling between the first controller 232 and the second controller 234 when the force applied to the mechanical linkage 244 reduces to below the first threshold amount of force (as long as the mechanical linkage 244 has not been permanently disconnected by the second override system 238, as described below).

Accordingly, the first override system 236 is configured such that: (i) while less than the first threshold amount of force is applied to the mechanical linkage 244 by the first controller 232 and the second controller 234, movement of the first controller 232 causes a corresponding movement of the second controller 234 and movement of the second controller 234 causes a corresponding movement of the first controller 232, and (ii) while greater than the first threshold amount of force is applied to the mechanical linkage 244 by the first controller 232 and the second controller 234, the first controller 232 and the second controller 234 move separately relative to each other.

Thus, when a jam occurs along the first control path 240 and impairs operation of the first controller 232, the first override system 236 allows the second controller 234 to be used to actuate the second flight control surface 216B. Similarly, when a jam occurs along the second control path 242 and impairs operation of the second controller 234, the first override system 236 allows the first controller 232 to be used to actuate the first flight control surface 216A. Accordingly, although the jam may impair operation of one of the first flight control surface 216A or the second flight control surface 216B, the aerial vehicle 100 can still be safely controlled using the other of the first flight control surface 216A or the second flight control surface 216B.

As examples, in an implementation in which the first controller 232 and the second controller 234 are wheels, the first threshold amount of force can be a value between approximately 35 pounds and approximately 50 pounds in one example, and between approximately 40 pounds and approximately 45 pounds in another example. Also as examples, in an implementation in which the first controller 232 and the second controller 234 are columns, the first threshold amount of force can be a value between approximately 55 pounds and approximately 75 pounds in one example, and between approximately 60 pounds and approximately 70 pounds in another example.

In other examples, the first threshold amount of force can be an amount that is unlikely to actuate the first override system 236 under certain flight conditions such as, for example, when the aerial vehicle 100 is in a stall. This can beneficially reduce (or prevent) inadvertent decoupling of the first controller 232 and the second controller 234. By the term "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

As noted above, in some instances, it can be beneficial to permanently disconnect the mechanical linkage 244 so that the first controller 232 and the second controller 234 move separately from each other at reduced input forces for the remainder of a flight. The second override system 238 is operable to permanently disconnect the mechanical linkage 244 between the first controller 232 and the second controller 234 responsive to greater than a second threshold amount of force applied to the mechanical linkage 244 by the first controller 232 and the second controller 234. After the mechanical linkage 244 is disconnected by the second override system 238, the first controller 232 and the second controller 234 can move separately relative to each other responsive to any force (e.g., a force that is less than the first threshold amount of force applied to the mechanical linkage 244 by the first controller 232 and the second controller 234).

In some examples, the second override system 238 can be a device, which is external to mechanical linkage 244. For instance, in some examples, the second override system 238 can include a bolt cutter, a wire cutter, and/or a cable cutter, which can be actuated to physically break or sever the mechanical linkage 244 between the first controller 232 and the second controller 234. In other examples, the mechanical linkage 244 can include the second override system 238. For instance, in some examples, the second override system 238 can include a shear pin, a solenoid actuated coupling, and/or a frangible nut along the mechanical linkage 244 between the first controller 232 and the second controller 234.

In general, the second threshold amount of force is greater than the first threshold amount of force. For instance, in one example, the second threshold amount of force can be a value greater than or equal to approximately 75 pounds (e.g., for an implementation in which the first controller 232 and the second controller 234 are wheels). In another example, the second threshold amount of force can be greater than or equal to approximately 120 pounds (e.g., for an implementation in which the first controller 232 and the second controller 234 are columns). In another example, the second threshold amount of force can be an amount of force that is a value between approximately 30% and approximately 100% greater than the first threshold amount of force.

Also, within examples, the second threshold amount of force can be an amount of force that reduces (or prevents) inadvertently disconnecting the mechanical linkage 244 between the first controller 232 and the second controller 234. This is beneficial because once the second override system 238 disconnects the mechanical linkage 244, the coupling between the first controller 232 and the second controller 234 cannot be restored during the flight. Rather, the mechanical linkage 244 can be restored after the flight by repair and/or replacement of the mechanical linkage 244.

Figure 3:
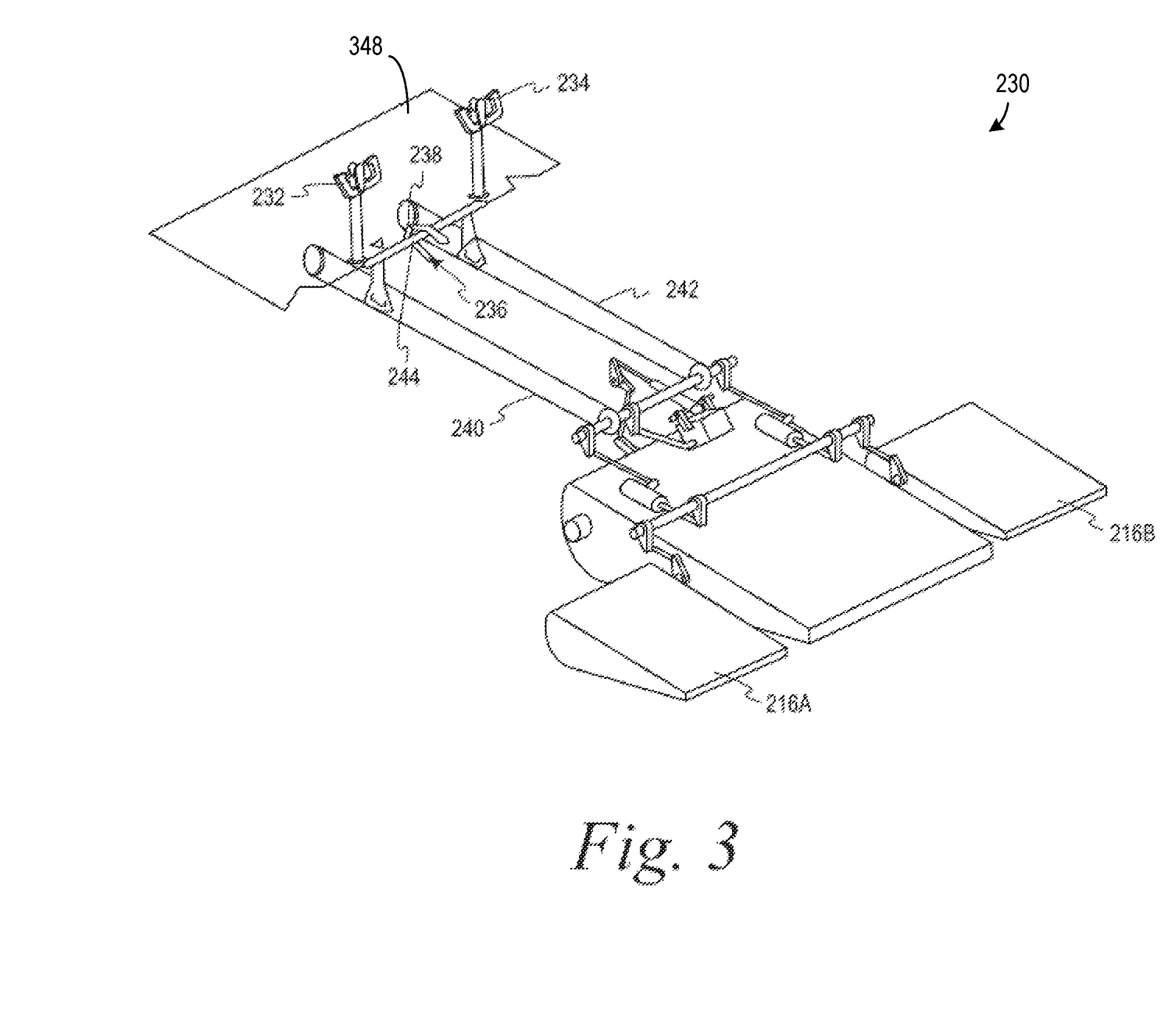
FIG. 3 illustrates a perspective view of a flight control system for an aerial vehicle, according to an example embodiment.

Referring now to FIG. 3, a perspective view of components of the flight control system 230 according to an example embodiment. As shown in FIG. 3, the first controller 232 is coupled to the first flight control surface 216A by the first control path 240, and the second controller 234 is coupled to the second flight control surface 216B. In FIG. 3, the first controller 232 is a first wheel extending from a cockpit floor 348, and the second controller 234 is a second wheel extending from the cockpit floor 348. As described above, the first controller 232 and the second controller 234 can additionally or alternatively include respective control sticks and/or a rudder pedals in other examples.

Also, in FIG. 3, the first flight control surface 216A is a first elevator and the second flight control surface 216B is a second elevator. In other examples, the first flight control surface 216A and the second flight control surface 216B can additionally or alternatively include one or more rudders, ailerons, flaps, spoilers, leading edge flaps, leading edge slats, and/or trim tabs.

As shown in FIG. 3, the first override system 236 includes the mechanical linkage 244 between the first controller 232 and the second controller 234. In FIG. 3, the second override system 238 is a shear pin along the mechanical linkage 244 at the first override system 236.

In this arrangement, the first pilot and/or the second pilot can fly the aerial vehicle 100 under normal operating conditions while the first controller 232 and the second controller 234 are not jammed. In such conditions, either pilot can apply an input force to the first controller 232 or the second controller 234, which causes the first controller 232 and the second controller 234 to apply to the mechanical linkage 244 a first force that is less than the first threshold amount of force. Under these circumstances, the input force causes the first controller 232 to move together with the second controller 234 and simultaneously actuates the first flight control surface 216A and the second flight control surface 216B.

When a jam occurs for one of the first controller 232 or the second controller 234, the first pilot and/or the second pilot can detect the jam by sensing an increased resistance to movement of the first controller 232 and/or the second controller 234. As noted above, the jam can be along at least one of (i) the first control path 240 between the first controller 232 and the first control surface 216A, or (ii) the second control path 242 between the second controller 234 and the second control surface 216B. In either case, the input force for moving the first controller 232 and the second controller 234 is increased due to the mechanical linkage 244 between the first controller 232 and the second controller 234.

Responsive to detecting the jam, the first pilot or the second pilot can apply an input force to the non-jammed controller, which causes the first controller 232 and the second controller 234 to apply to the mechanical linkage 244 a second force that is greater than the first threshold amount of force. This causes the first override system 236 to temporarily decouple the first controller 232 and the second controller 234. Thus, the second force causes the first controller 232 and the second controller 234 to move separately relative to each other, actuating one of the first flight control surface 216A or the second flight control surface 216B (i.e., the flight control surface 216A, 216B that is coupled to the non-jammed controller 232, 234).

To reduce the input force for controlling the aerial vehicle 100, the first pilot and/or the second pilot can decide to actuate the second override system 238. In this case, the first pilot or the second pilot can apply an input force to the non-jammed one of the first controller 232 or the second controller 234, which causes the first controller 232 and the second controller 234 to apply to the mechanical linkage 244 a third force that is greater than a second threshold amount of force. This causes the second override system 238 to disconnect the mechanical linkage 244 between the first controller 232 and the second controller 234.

After applying the third force to disconnect the mechanical linkage 244, the first pilot or the second pilot can move the first controller 232 separately from the second controller 234 with a reduced input force. Specifically, the first pilot or the second pilot can move the first controller 232 separately from the second controller 234 to actuate one of the first flight control surface 216A or the second flight control surface 216B even though the first controller 232 and the second controller 234 apply less than the first threshold amount of force to the mechanical linkage 244.

Figure 4A:
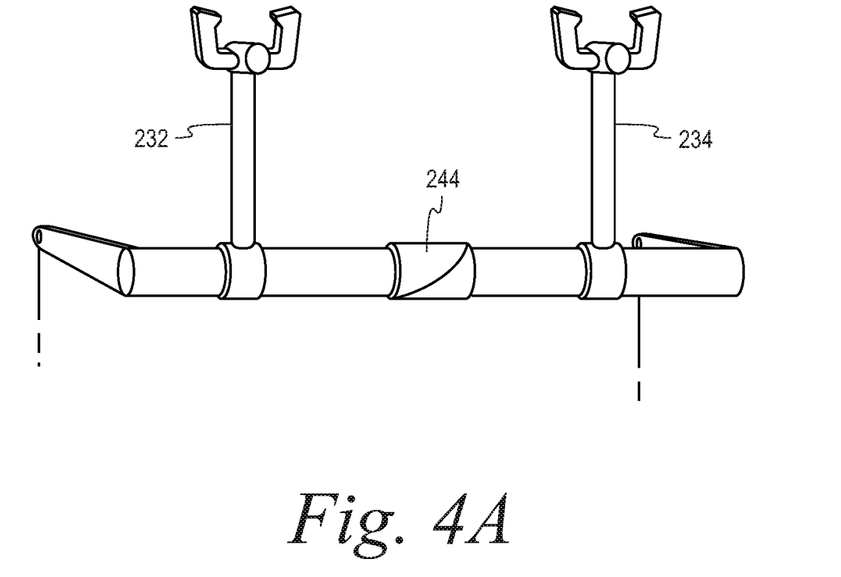
FIG. 4A illustrates a perspective view of a portion of a flight control system in a first state, according to an example embodiment.
Figure 4B:
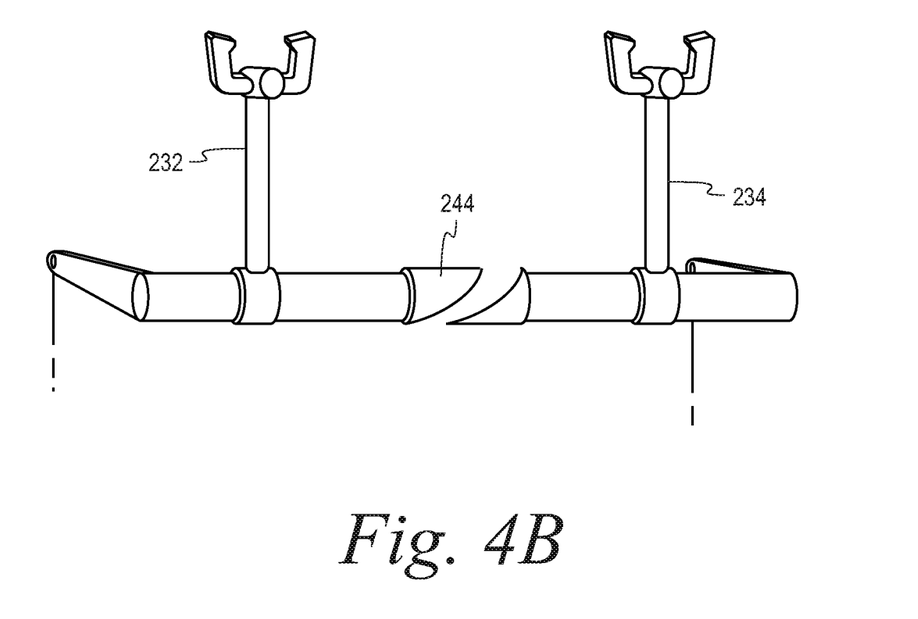
FIG. 4B illustrates a perspective view of a portion of a flight control system of FIG. 4A in a second state, according to an example embodiment.

FIG. 4A and FIG. 4B depict perspective views of a portion of a flight control system 230 before and after, respectively, the second override system 238 is actuated to disconnect the mechanical linkage 244. As shown in FIG. 4A, prior to the second override system 238 disconnecting the mechanical linkage 244, the first controller 232 is coupled to the second controller 234. Thus, in this first state, (i) while less than the first threshold amount of force is applied to the mechanical linkage 244 by the first controller 232 and the second controller 234, movement of the first controller 232 causes a corresponding movement of the second controller 234 and movement of the second controller 234 causes a corresponding movement of the first controller 232, and (ii) while greater than the first threshold amount of force is applied to the mechanical linkage 244 by the first controller 232 and the second controller 234, the first controller 232 and the second controller 234 move separately relative to each other.

As shown in FIG. 4B, after the second override system 238 disconnects the mechanical linkage 244, the first controller 232 and the second controller 234 move independently of each other. That is, with the mechanical linkage 244 is physically broken such that moving the first controller 232 does not cause a corresponding movement of the second controller 234, and moving the second controller 234 does not cause a corresponding movement of the first controller 232.

Figure 5:
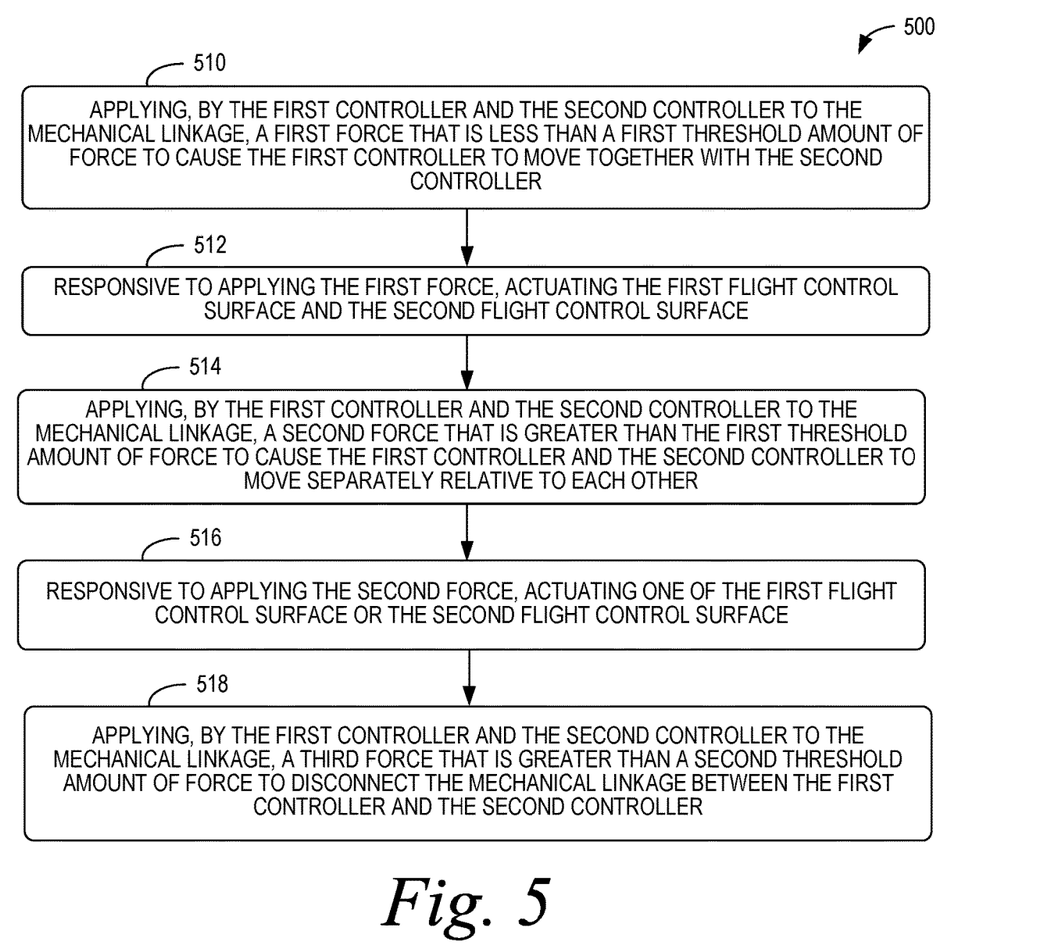
FIG. 5 illustrates a flow chart of an example process for operating an aerial vehicle, according to an example embodiment.

Referring now to FIG. 5, a flowchart for a process 500 for operating an aerial vehicle is illustrated according to an example embodiment. The aerial vehicle includes a first controller configured to control a first flight control surface, a second controller configured to control a second flight control surface, a first override system including a mechanical linkage between the first controller and the second controller, and a second override system.

As shown in FIG. 5, at block 510, the process 500 includes applying, by the first controller and the second controller to the mechanical linkage, a first force that is less than a first threshold amount of force to cause the first controller to move together with the second controller.

Responsive to applying the first force at block 510, the process 500 includes actuating the first flight control surface and the second flight control surface at block 512.

At block 514, the process 500 includes applying, by the first controller and the second controller to the mechanical linkage, a second force that is greater than the first threshold amount of force to cause the first controller and the second controller to move separately relative to each other.

Responsive to applying the second force at block 516, the process 500 includes actuating one of the first flight control surface or the second flight control surface at block 516.

At block 518, the process 500 includes applying, by the first controller and the second controller to the mechanical linkage, a third force that is greater than a second threshold amount of force to disconnect the mechanical linkage between the first controller and the second controller. The second threshold amount of force is greater than the first threshold amount of force.

Figure 6:
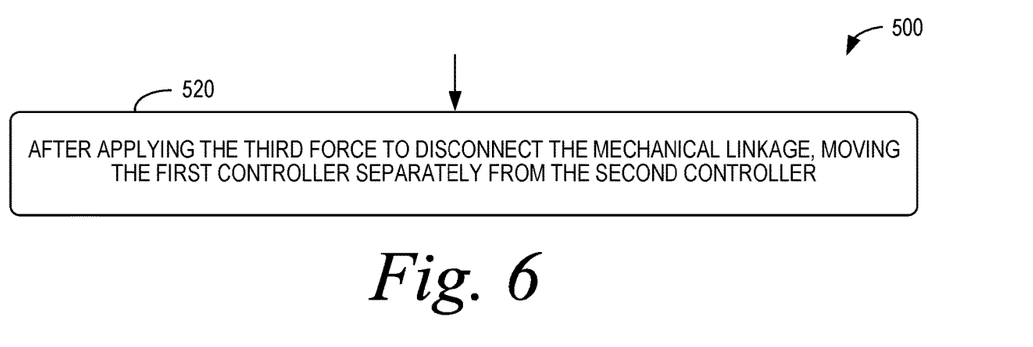
FIG. 6 illustrates a flow chart of an example process for operating an aerial vehicle that can be used with the process shown in FIG. 5.

FIGS. 6-15 depict additional aspects of the process 500 according to further examples. As shown in FIG. 6, the process 500 can also include after applying the third force to disconnect the mechanical linkage at block 518, moving the first controller separately from the second controller at block 520.

Figure 7:
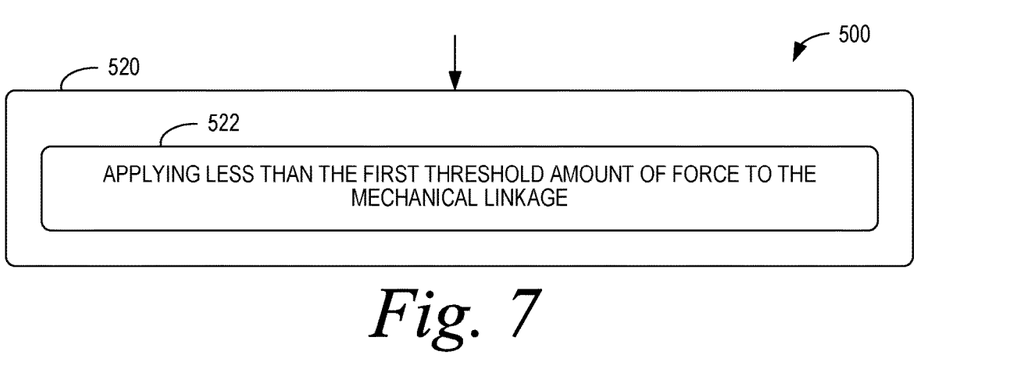
FIG. 7 illustrates a flow chart of an example process for operating an aerial vehicle that can be used with the process shown in FIG. 6.

As shown in FIG. 7, moving the first controller separately from the second controller at block 520 can include applying less than the first threshold amount of force to the mechanical linkage at block 522.

Figure 8:
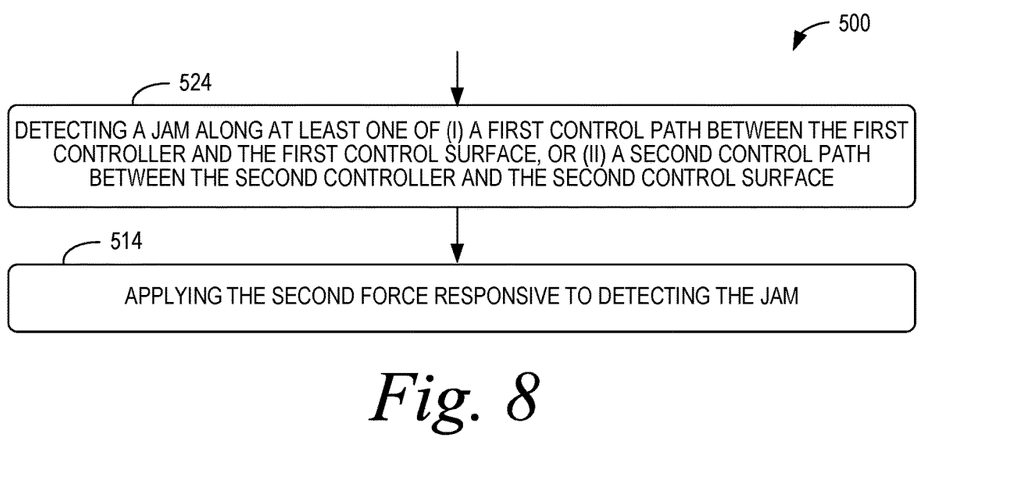
FIG. 8 illustrates a flow chart of an example process for operating an aerial vehicle that can be used with the process shown in FIG. 5.

As shown in FIG. 8, the process 500 can also include, at block 524, detecting a jam along at least one of (i) a first control path between the first controller and the first control surface, or (ii) a second control path between the second controller and the second control surface. Also, as shown in FIG. 8, applying the second force at block 514 can be responsive to detecting the jam at block 524.

Figure 9:
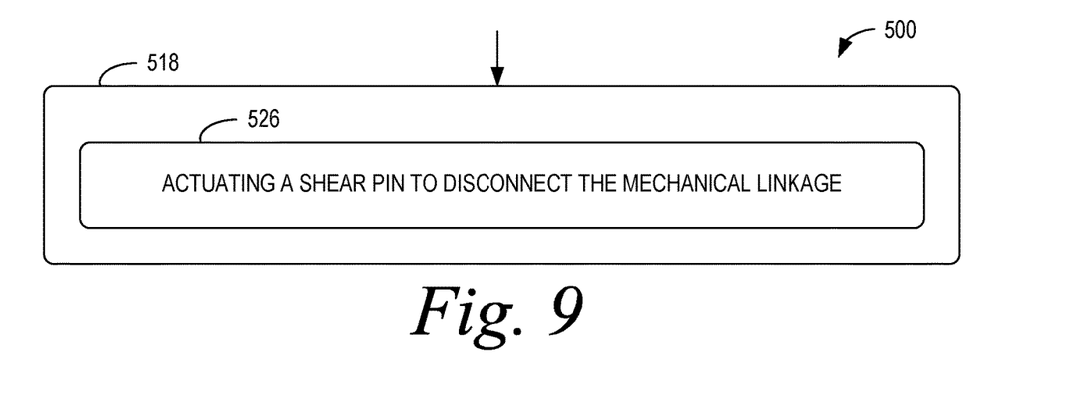
FIG. 9 illustrates a flow chart of an example process for operating an aerial vehicle that can be used with the process shown in FIG. 5.

As shown in FIG. 9, applying the third force to disconnect the mechanical linkage at block 518 can include actuating a shear pin to disconnect the mechanical linkage at block 526.

Figure 10:
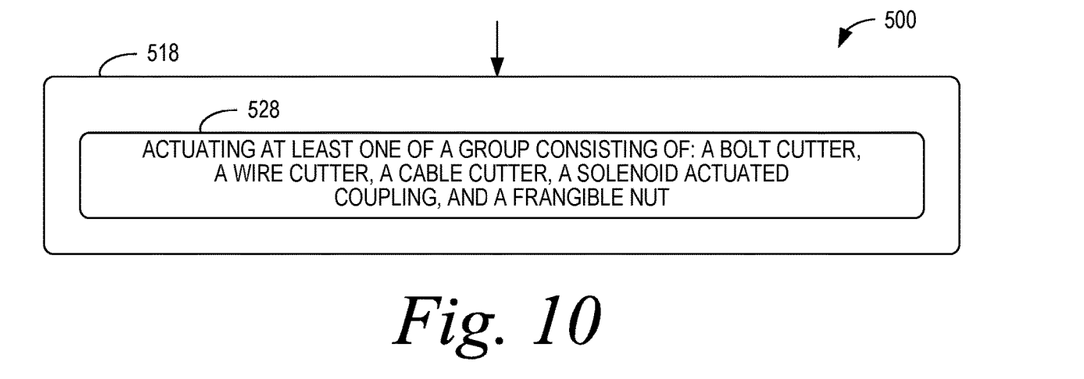
FIG. 10 illustrates a flow chart of an example process for operating an aerial vehicle that can be used with the process shown in FIG. 5.

As shown in FIG. 10, applying the third force to disconnect the mechanical linkage at block 518 can include, at block 528, actuating at least one of a group consisting of: a bolt cutter, a wire cutter, a cable cutter, a solenoid actuated coupling, and a frangible nut.

Figure 11:
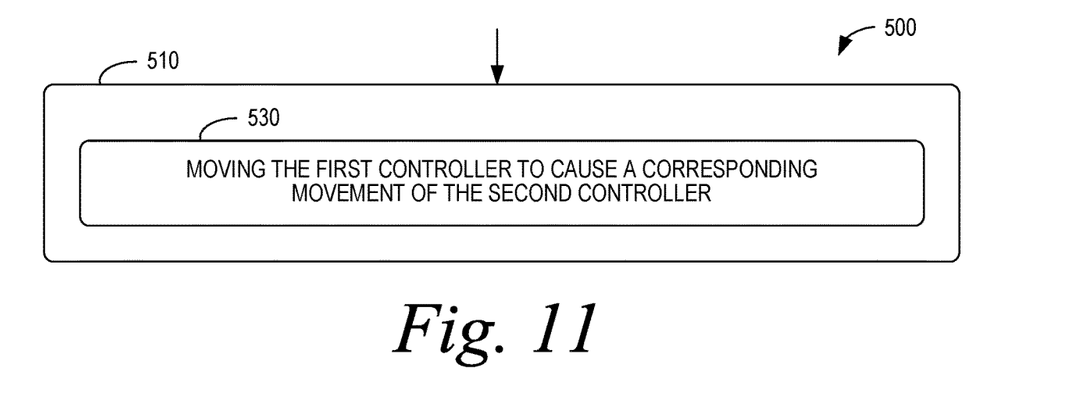
FIG. 11 illustrates a flow chart of an example process for operating an aerial vehicle that can be used with the process shown in FIG. 5.

As shown in FIG. 11, applying the first force at block 510 can include moving the first controller to cause a corresponding movement of the second controller at block 530.

Figure 12:
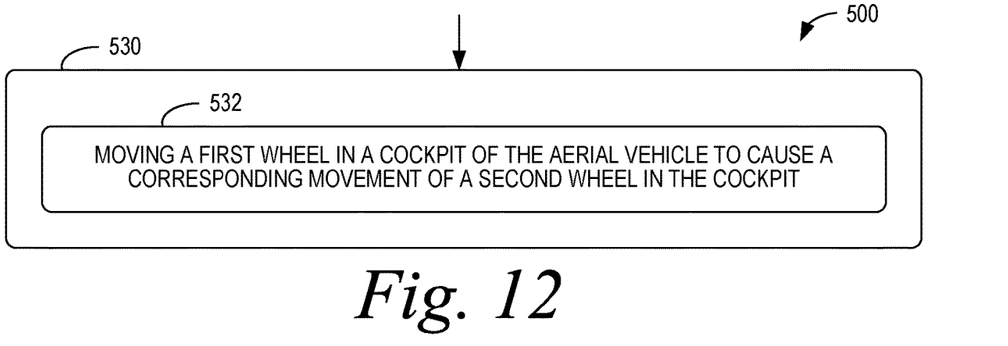
FIG. 12 illustrates a flow chart of an example process for operating an aerial vehicle that can be used with the process shown in FIG. 11.

As shown in FIG. 12, moving the first controller at block 530 can include moving a first wheel in a cockpit of the aerial vehicle to cause a corresponding movement of a second wheel in the cockpit at block 532.

Figure 13:
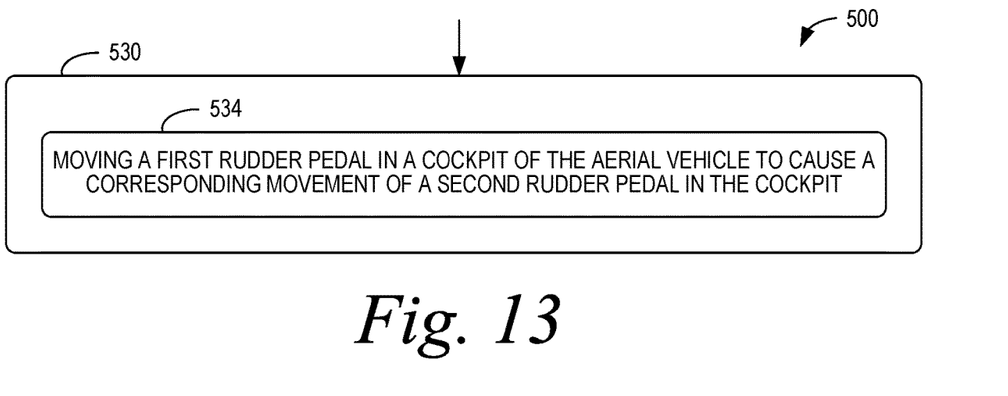
FIG. 13 illustrates a flow chart of an example process for operating an aerial vehicle that can be used with the process shown in FIG. 11.

As shown in FIG. 13, moving the first controller at block 530 can include moving a first rudder pedal in a cockpit of the aerial vehicle to cause a corresponding movement of a second rudder pedal in the cockpit at block 534.

Figure 14:
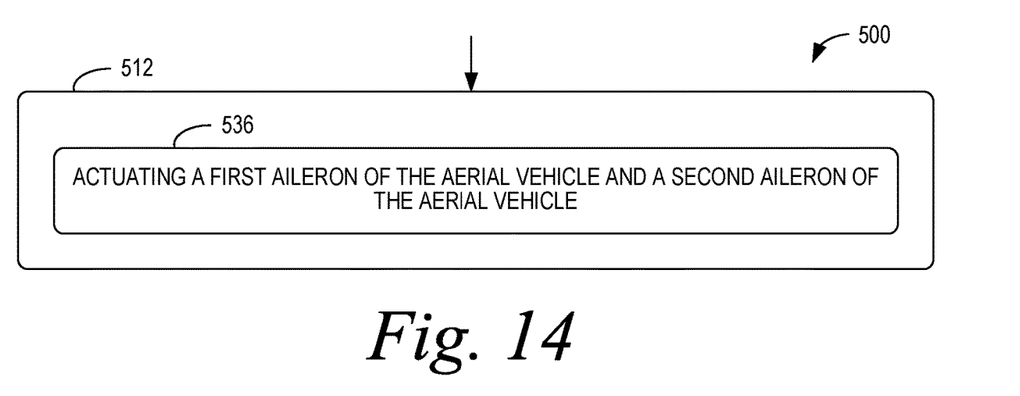
FIG. 14 illustrates a flow chart of an example process for operating an aerial vehicle that can be used with the process shown in FIG. 5.

As shown in FIG. 14, actuating the first flight control surface and the second flight control surface at block 512 can include actuating a first aileron of the aerial vehicle and a second aileron of the aerial vehicle at block 536.

Figure 15:
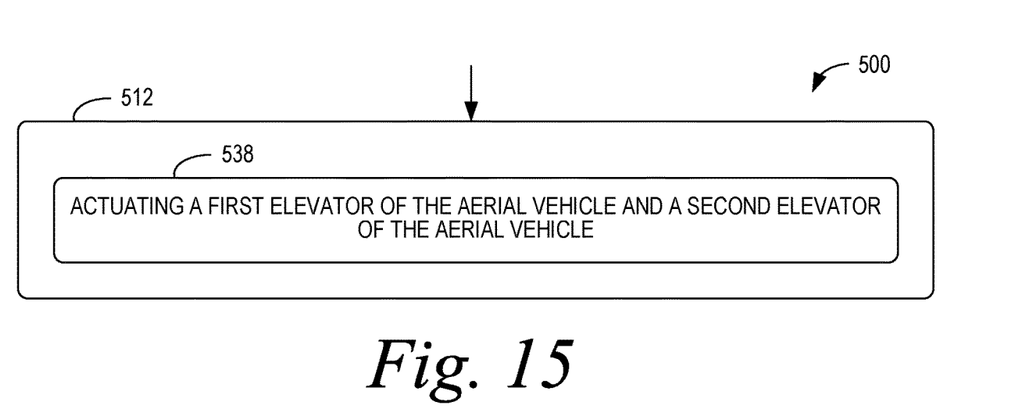
FIG. 15 illustrates a flow chart of an example process for operating an aerial vehicle that can be used with the process shown in FIG. 5.

As shown in FIG. 15, actuating the first flight control surface and the second flight control surface at block 512 can include actuating a first elevator of the aerial vehicle and a second elevator of the aerial vehicle at block 538.

One or more of the blocks shown in FIGS. 6-15 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A system, comprising:
  a first controller in a cockpit of an aerial vehicle and configured to control a first flight control surface of the aerial vehicle;
  a second controller in a cockpit of an aerial vehicle and configured to control a second flight control surface of the aerial vehicle;
  a first override system comprising a mechanical linkage between the first controller and the second controller, wherein the first override system is configured such that:
    (i) while less than a first threshold amount of force is applied to the mechanical linkage by the first controller and the second controller, movement of the first controller causes a corresponding movement of the second controller and movement of the second controller causes a corresponding movement of the first controller, and
    (ii) while greater than the first threshold amount of force is applied to the mechanical linkage by the first controller and the second controller, the first controller and the second controller move separately relative to each other; and
  a second override system operable to permanently disconnect the mechanical linkage between the first controller and the second controller responsive to greater than a second threshold amount of force applied to the mechanical linkage by the first controller and the second controller, and
  wherein the second threshold amount of force is greater than the first threshold amount of force.

2. The system of claim 1, wherein the second override system comprises a shear pin configured to permanently disconnect the mechanical linkage.

3. The system of claim 1, wherein the second override system comprises at least one of a group consisting of: a bolt cutter, a wire cutter, a cable cutter, a solenoid actuated coupling, and a frangible nut.

4. The system of claim 1, wherein the first override system comprises a load limiter.

5. The system of claim 1, wherein the first controller comprises a first rudder pedal in a cockpit of the aerial vehicle, and the second controller comprises a second rudder pedal in the cockpit of the aerial vehicle.

6. The system of claim 1, wherein the first controller comprises a first wheel in a cockpit of the aerial vehicle, and the second controller comprises a second wheel in the cockpit of the aerial vehicle.

7. The system of claim 1, wherein the first flight control surface comprises a first aileron of the aerial vehicle, and the second flight control surface comprises a second aileron of the aerial vehicle.

8. The system of claim 1, wherein the first flight control surface comprises a first elevator of the aerial vehicle, and the second flight control surface comprises a second elevator of the aerial vehicle.

9. The system of claim 1, wherein, after the mechanical linkage is disconnected by the second override system, the first controller and the second controller are configured to move separately relative to each other responsive to less than the first threshold amount of force applied to the mechanical linkage by the first controller and the second controller.

10. A method of operating an aerial vehicle, wherein the aerial vehicle comprises a first controller in a cockpit of the aerial vehicle and configured to control a first flight control surface, a second controller in the cockpit of the aerial vehicle and configured to control a second flight control surface, a first override system including a mechanical linkage between the first controller and the second controller, and a second override system, the method comprising:
  applying, by the first controller and the second controller to the mechanical linkage, a first force that is less than a first threshold amount of force to cause the first controller to move together with the second controller;
  responsive to applying the first force, actuating the first flight control surface and the second flight control surface;
  applying, by the first controller and the second controller to the mechanical linkage, a second force that is greater than the first threshold amount of force to cause the first controller and the second controller to move separately relative to each other;
  responsive to applying the second force, actuating one of the first flight control surface or the second flight control surface; and
  applying, by the first controller and the second controller to the mechanical linkage, a third force that is greater than a second threshold amount of force to permanently disconnect the mechanical linkage between the first controller and the second controller,
  wherein the second threshold amount of force is greater than the first threshold amount of force.

11. The method of claim 10, further comprising:
  after applying the third force to disconnect the mechanical linkage, moving the first controller separately from the second controller.

12. The method of claim 11, wherein moving the first controller separately from the second controller comprises applying less than the first threshold amount of force to the mechanical linkage.

13. The method of claim 10, further comprising detecting a jam along at least one of (i) a first control path between the first controller and the first control surface, or (ii) a second control path between the second controller and the second control surface,
  wherein applying the second force is responsive to detecting the jam.

14. The method of claim 10, wherein applying the third force to disconnect the mechanical linkage comprises actuating a shear pin to disconnect the mechanical linkage.

15. The method of claim 10, wherein applying the third force to disconnect the mechanical linkage comprises actuating at least one of a group consisting of: a bolt cutter, a wire cutter, a cable cutter, a solenoid actuated coupling, and a frangible nut.

16. The method of claim 10, wherein applying the first force comprises moving the first controller to cause a corresponding movement of the second controller.

17. The method of claim 16, wherein moving the first controller comprises moving a first wheel in a cockpit of the aerial vehicle to cause a corresponding movement of a second wheel in the cockpit.

18. The method of claim 16, wherein moving the first controller comprises moving a first rudder pedal in a cockpit of the aerial vehicle to cause a corresponding movement of a second rudder pedal in the cockpit.

19. The method of claim 10, wherein actuating the first flight control surface and the second flight control surface comprises actuating a first aileron of the aerial vehicle and a second aileron of the aerial vehicle.

20. The method of claim 10, wherein actuating the first flight control surface and the second flight control surface comprises actuating a first elevator of the aerial vehicle and a second elevator of the aerial vehicle.

* * * * *